US011841892B2

(12) United States Patent
Mathur et al.

(10) Patent No.: US 11,841,892 B2
(45) Date of Patent: Dec. 12, 2023

(54) GENERATING TEST SCENARIOS BY DETECTING FAILURE PATTERNS AND THEMES IN CUSTOMER EXPERIENCES

(71) Applicant: Dell Products L.P., Round Rock, TX (US)

(72) Inventors: Prateek Mathur, Round Rock, TX (US); Anish Arora, Round Rock, TX (US); Mallory Anne Kolodzey, Pflugerville, TX (US); Shalu Singh, Austin, TX (US); Amit Sawhney, Round Rock, TX (US); Sathish Kumar Bikumala, Round Rock, TX (US); Gautam K. Kaura, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 350 days.

(21) Appl. No.: 17/198,836

(22) Filed: Mar. 11, 2021

(65) Prior Publication Data
US 2022/0292125 A1   Sep. 15, 2022

(51) Int. Cl.
| | | |
|---|---|---|
| *G06F 16/35* | (2019.01) | |
| *G06Q 10/067* | (2023.01) | |
| *G06Q 30/0201* | (2023.01) | |
| *G06N 20/00* | (2019.01) | |
| *G06F 40/30* | (2020.01) | |
| *G06F 40/166* | (2020.01) | |
| *G10L 15/22* | (2006.01) | |
| *G10L 15/18* | (2013.01) | |
| *G06F 40/232* | (2020.01) | |
| *G06V 10/40* | (2022.01) | |
| *G06V 20/40* | (2022.01) | |
| *G06V 30/10* | (2022.01) | |

(52) U.S. Cl.
CPC .......... *G06F 16/353* (2019.01); *G06F 40/166* (2020.01); *G06F 40/232* (2020.01); *G06F 40/30* (2020.01); *G06N 20/00* (2019.01); *G06Q 10/067* (2013.01); *G06Q 30/0201* (2013.01); *G06V 10/40* (2022.01); *G06V 20/40* (2022.01); *G10L 15/1815* (2013.01); *G10L 15/22* (2013.01); *G06V 30/10* (2022.01)

(58) Field of Classification Search
CPC ...... G06F 16/353; G06F 40/166; G06N 20/00
See application file for complete search history.

(56) References Cited

U.S. PATENT DOCUMENTS

| | | | | |
|---|---|---|---|---|
| 10,489,864 | B1 * | 11/2019 | Werr .................. | G06Q 20/22 |
| 2015/0286627 | A1 * | 10/2015 | Chang ................ | G06F 40/205 |
| | | | | 704/9 |

(Continued)

*Primary Examiner* — Loc Tran
(74) *Attorney, Agent, or Firm* — Amin, Turocy & Watson, LLP

(57) ABSTRACT

The described technology is generally directed towards processing various customer input data to extract frequently recurring customer experience themes, including positive and negative sentiment regarding customer experiences. Natural language processing, image processing, speech recognition and/or computer vision techniques can be used on customer-related data to determine themes, tests and scenarios, as well as discover insights that can be used to improve customer experiences. The technology can be used to recreate a customer engagement, journey and overall experience by designing test scenarios around failure themes.

20 Claims, 11 Drawing Sheets

(56) References Cited

U.S. PATENT DOCUMENTS

2020/0302681 A1\* 9/2020 Totty .................. G06T 7/74
2021/0342927 A1\* 11/2021 Morin ............... G06Q 30/0276
2022/0230089 A1\* 7/2022 Peraud .................. G06N 3/084

\* cited by examiner

FIG. 6

| TEST DESIGN | Escalation Mitigation | | Escalation Management | | Final Result |
|---|---|---|---|---|---|
| | First Resolution Attempt | Repeat Res. Attempt {3} | Prioritized Resolution | Specialized Treatment | |
| Consumer | | | | | |
| Product J1 / Premium Support / Operating System V14.2 Upgrade | X | X | X | X | Not resolved, unhappy Customer |
| Product J48 / Onsite Service / No Power >> Overheating | X | X | X — Help a Customer | X | Resolved *30+ days later* |
| Product A38 R4 / Premium Support / Faulty Drive, No Boot | X | X | X — Help a Customer | X | Not resolved, unhappy Customer |
| Product J67 A3 R6 / Mail in Service / Optical Drive Failure | X | X | X | X | Not resolved, unhappy Customer |
| Product J53 / Mail in Service / Intermittent Shutdown / Reboot Issue | X | X | X | X | Not resolved, unhappy Customer |
| Commercial | | | | | |
| Product L4598 / Basic with Onsite / No Video >> No Power | ✓ *New Issue Introduced | X | X | ✓ | Resolved *High effort by Customer* |
| Product L575 / Mail in Service / No Video Issue | ✓ *New Issue Introduced | X | X | ✓ | Resolved *High effort by Customer* |
| P Server / Out of Warranty / Warranty Purchase Refund | X | X | X | X | Resolved 31 days later |
| Infrastructure Group | | | | | |
| Switch / Next Business Day Service / No Power | ✓ | N/A | N/A | N/A | Resolved in First Engagement |

GENERATING TEST SCENARIOS BY DETECTING FAILURE PATTERNS AND THEMES IN CUSTOMER EXPERIENCES

BACKGROUND

The subject application relates generally to processing customer sentiments with respect to recurring customer experience themes from large amounts of data, and related embodiments.

There are many sources of information related to customers' experiences with an enterprise's products and services. For example, "the voice of the customer" can be obtained when customers call in or chat with a service agent or the like when there is a problem with a product, from social media postings, blogs and other commentary regarding a company's product and services, from product reviews and comparisons published by experts and/or the general public, and so on.

Customer quality assurance generally refers to the testing of customer journeys against offer promises. The testing can be end-to-end, e.g., from the buying process to the service process, and any (e.g., third-party) feedback throughout the customer interaction experiences, as well as afterwards. The complex and dynamic end-to-end view of a customer's journey is valuable information to a company, but in general only very limited manual analysis attempts to capture some of this information.

BRIEF DESCRIPTION OF THE DRAWINGS

The technology described herein is illustrated by way of example and not limited in the accompanying figures in which like reference numerals indicate similar elements and in which:

FIG. 6 is an example representation of test designs and results based on processing customer input data, in accordance with various aspects and implementations of the subject disclosure.

DETAILED DESCRIPTION

Various aspects of the technology described herein are generally directed towards extracting frequent recurring failure themes in complex customer journeys from large amounts of synthesized information, e.g., related to an enterprise's products and services. As will be understood, the technology facilitates the setting of automated triggers for frequently occurring failure themes against set thresholds, for configuring tests.

In one aspect, natural language processing, image processing and/or computer vision techniques applied to customer experience-related data creates a list of themes, tests and scenarios, which can be maintained in a unified data store for evaluation, analysis and additional use cases. For example, the unified data store can be processed to recreate simulated customer engagements, journeys and experiences by designing test scenarios around failure themes. As another example, the unified data store can be analyzed to discover various insights, and leverage those insights to determine moments that matter from customers' viewpoints, including both negative and positive paths corresponding to customers' journeys.

It should be understood that any of the examples herein are non-limiting. For instance, some of the examples herein are based on computer device products, including servers, laptops, personal computers, data storage products and the like, as well as related support services; however the technology described herein may benefit virtually any manufacturer/vendor of a product or service. As such, any of the embodiments, aspects, concepts, structures, functionalities or examples described herein are non-limiting, and the technology may be used in various ways that provide benefits and advantages in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
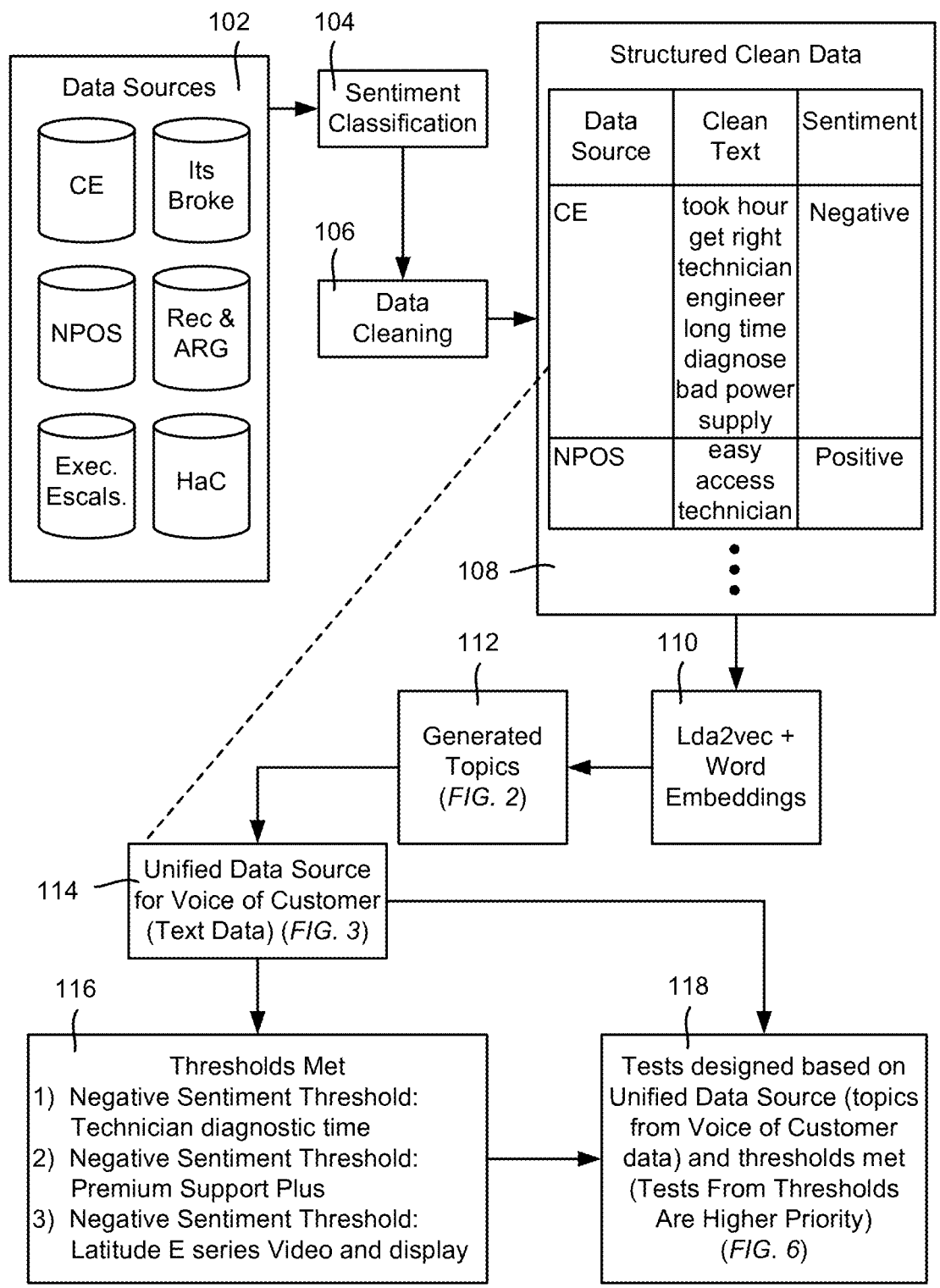
FIG. 1 is an example block diagram representation of natural language processing various customer input data as a basis for generating simulated tests, in accordance with various aspects and implementations of the subject disclosure.

FIG. 1 shows aspects of processing customer-related data from multiple, generally disparate data sources 102, including via natural language processing of the data. In one non-limiting example implementation, the various sources of data comprise a customer experience (CE) data store of direct customer feedback. Note that voice recordings can be speech recognized into text transcripts as part of this or any other data store. A Help a Customer (HaC) data store includes enterprise-internal information submitted by corporate employees on behalf of customers, generally including complaints, feedback, and concerns. A resolution expert center (Rec) and advanced resolution group (ARG) data store comprises internal feedback from support technicians or the like that work with customers. A near point of sale (NPOS) data store is generally tied to warranty-related issues, such as information obtained from a customer when a customer is buying or extending a warranty, when a warranty expiration warning is sent to the customer, and so on. Executive escalations refer to high priority information. Other data sources (not explicitly represented in FIG. 1) can include a net promoter score data store that contains information on customer loyalty metrics that measure the willingness of customers to return for another purchase or service, as well as make a recommendation to their family, friends or colleagues. A customer relationship management data store can be based on a customer complaint program or the like made available for customers to address systemic pain points. As is understood, these are only non-limiting examples of data sources, and in a given implementation, not all of these example data sources need be used, additional other data sources can be used, one set of data sources can be used in one scenario (e.g., generate tests based on service and support feedback), while another set of data sources can be used in another scenario (e.g., generate different tests based on product feedback), and so on.

In one aspect, each group of data can be considered a document, e.g., represented by its specific data source and its text. As represented by block 104, each document can be classified for sentiment based on the text words therein, e.g., negative or positive (or possibly neutral) sentiment. Various classifiers for determining sentiment for a set of words are known and one (or more) can be used, including, for example, evaluating the number of words considered positive versus those considered negative.

Another operation, represented in FIG. 1 by block 104, is to clean the data, e.g., to correct spelling errors, remove stopwords, remove duplicated entries, remove punctuation, remove any personal information (e.g., email addresses, phone numbers and so forth) of the customers, perform word lemmatization and or stemming. Language translation can also be performed. In addition to a regular dictionary, the spell check dictionary can have terms customized for the enterprise, such as brand names, product names and so on that are not found in a standard spell check dictionary.

Note that it is feasible to classify for sentiment and clean the data in separate, independent operations, e.g., before storing in the data stores of the data sources 102. However, having the actual data may allow for additional data processing and analysis.

Once classified for sentiment and cleaned, the documents can be arranged in a suitable data structure of structured clean data 108. In the example of FIG. 1, the structured clean data 108 is arranged such that each document is basically a record, with fields comprising the specific data source of the text, the clean text, and the sentiment determined from the clean text. Other fields will be filled in as described herein.

The structured clean data 108 is natural language processed (block 110) into generated topics 112. In one aspect, the natural language processing is Lda2vec, which is publicly described and publicly available for use in various software libraries. In general, Lda2vec is based on Latent Dirichlet Allocation and word embeddings In Lda2vec, for a group of words, a pivot word vector and a document vector are added to obtain a context vector, and the context vector is used to predict context words. One model is:

$$\mathcal{L} = \mathcal{L}^d + \sum_{ij} \mathcal{L}_{ij}^{neg}$$

$$\mathcal{L}_{ij}^{neg} = \log\sigma(\vec{c}_j \cdot \vec{w}_i) + \sum_{l=0}^{n} \log\sigma(-\vec{c}_j \cdot \vec{w}_l)$$

where the total loss term $\mathcal{L}$ is the sum of the skipgram negative sampling loss $\mathcal{L}_{ij}^{neg}$ with the addition of a Dirichlet-likelihood term over document weights, $\mathcal{L}^d$. The context vector is represented by $\vec{c}_j$, the pivot word vector is represented by $\vec{w}_j$, the target word vector is represented by $\vec{w}_i$, and the negatively-sampled word vector is represented by $\vec{w}_l$. The document vector can be represented by:

$$\vec{d}_j = p_{j0} \cdot \vec{t}_0 + p_{j1} \vec{t}_1 + \ldots + p_{jk} \cdot \vec{t}_k + \ldots + p_{jn} \cdot \vec{t}_n$$

where the p values represent scalar weights and the t values represent the topic bases.

Figure 2:
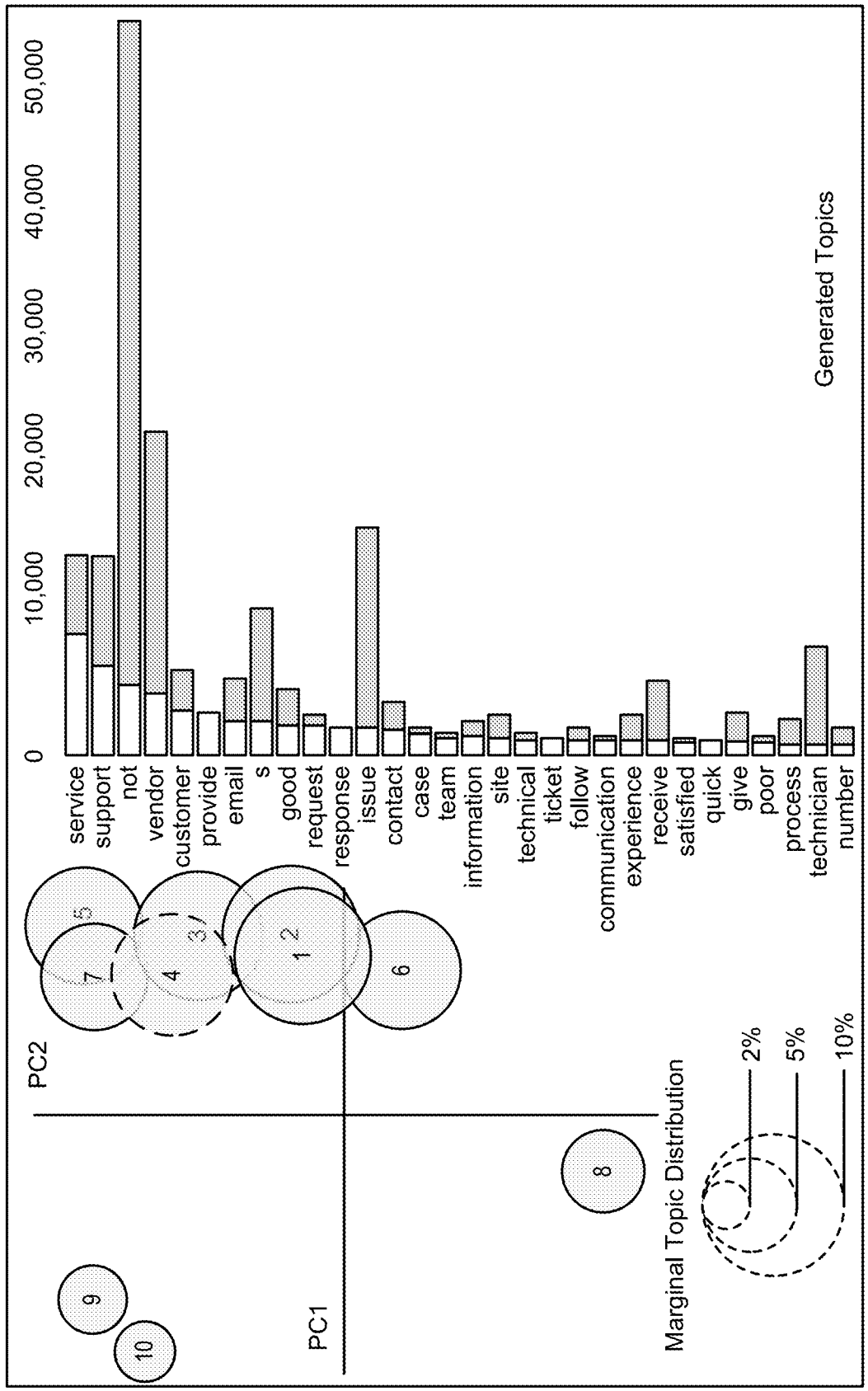
FIG. 2 is an example block diagram showing how natural language processing applied to customer input data can generate topics, and terms/term frequency for a selected one of the topics, in accordance with various aspects and implementations of the subject disclosure.

Example generated topics are shown as the circles labeled 1-10 in FIG. 2, in which selection of a topic (topic 4, as indicated by the dashed circle labeled 4) displays the terms of that topic. In FIG. 2, overall term frequency is shown by the shaded bar after each term, with the unshaded portion representing the estimated term frequency within the selected topic. The number of generated topics, ten in this example, can be chosen. Further, each topic can be divided into a number of (e.g., ten) buckets, corresponding to dominant topics and subtopics, providing more specific themes. Term saliency and term relevance can be used to determine the subtopics of a topic.

For example, for a topic t, and conditional probability p(t|w), which is the likelihood that an observed word w was generated by the latent topic t, saliency can be defined as:

saliency(term $w$)=frequency($w$)*[sum_$t$ $p(t|w)$*log($p(t|w)/p(t)$)]; and relevance can be defined (where $\lambda$, a value between 0 and 1, determines the weight given to the probability of term w under topic t relative to its lift), as:

relevance(term $w$|topic $t$)=$\lambda$*$p(w|t)$+(1−$\lambda$)*$p(w|t)/p(w)$.

Figure 3:
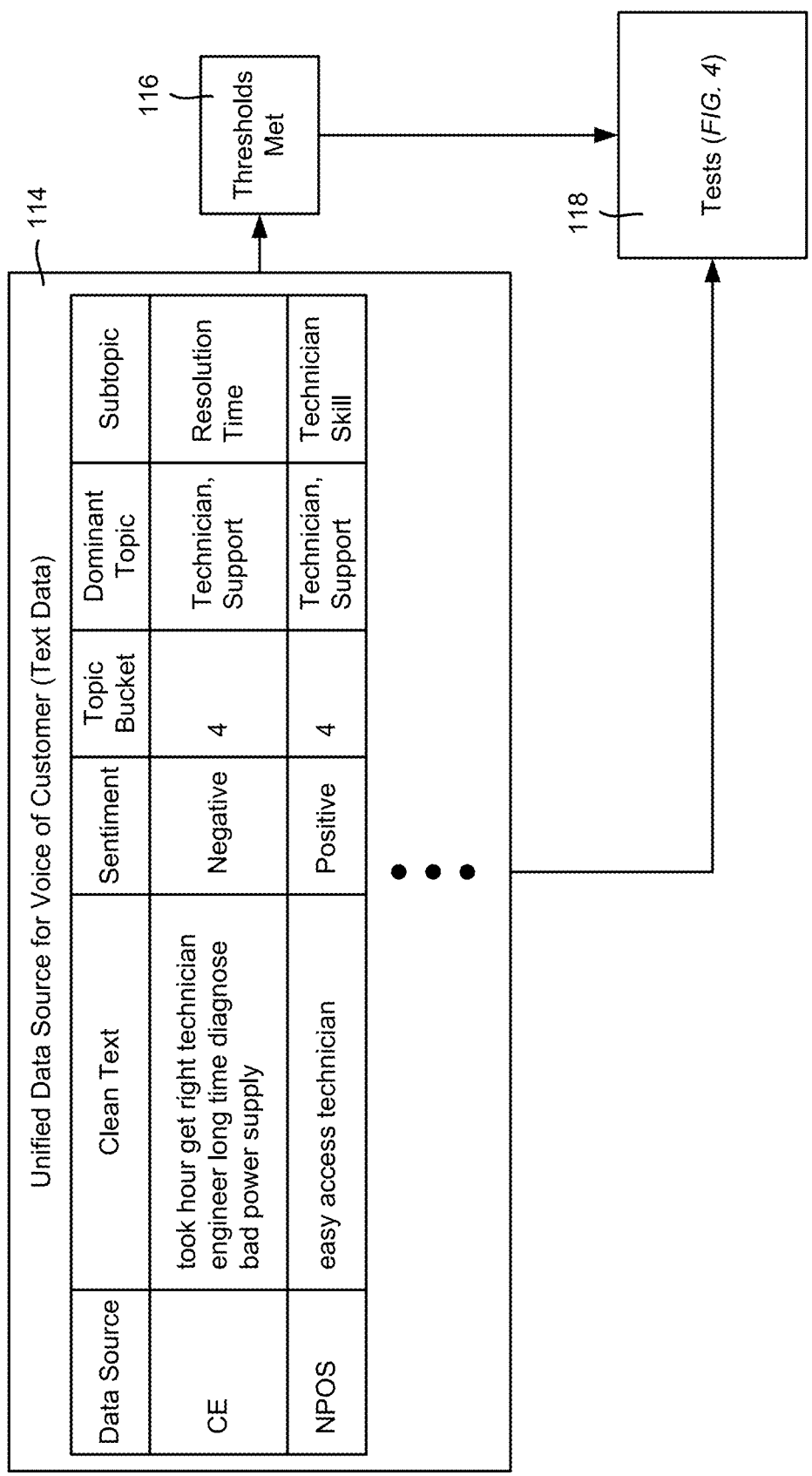
FIG. 3 is an example representation of part of a data structure of a unified data source for voice of customer text data obtained via natural language processing applied to customer input data, in accordance with various aspects and implementations of the subject disclosure.

Returning to FIG. 1, the generated topics 112 and terms can be used to determine to which topic bucket (or topic buckets) each document belongs, along with a dominant topic term(s) and subtopic term(s) for that document. This information is added to further fields of the document's record, as shown in the unified data source for voice of customer (block 114), with further example details shown in FIGS. 3 and 6.

Turning to test generation, tests can be generated in a number of ways from the unified data source/structured clean data 108, including automated generation, manual generation or a combination of automated and manual generation. A straightforward way to determine that a test should be conducted is to determine which themes (e.g., based on sharing dominant topics and subtopics) are commonly recurring themes with negative sentiment. This (e.g., a sentiment score obtained from counting documents having negative sentiment scores with the same themes) can be evaluated against a user-controlled threshold value (e.g., a count or a percentage). For example, consider that customers often complain that support technicians are taking too much time to resolve a problem; (dominant topic is technician, support, subtopic is resolution time). If this complaint is repeated too many times, e.g., more than a threshold percentage (e.g., sixty percent) of negative sentiment instances of topic bucket four have this theme, then a test can be automatically generated to determine why it is taking technicians too long to resolve an issue from many customers' perspectives.

Tests can also be generated from the unified data source/structured clean data 108 without threshold evaluation. For example, tests related to a product may arise from data analysis of the data 108, without any particular threshold. Note that in one implementation, tests generated from threshold comparisons are given higher priority that tests generated based directly on the data. As another way to generate a test, positive sentiment can be evaluated against negative sentiment for a given theme, (e.g., by sorting by themes and counting the positive and negative labels), with a test generated if the negative sentiment outweighs the positive sentiment, e.g., by a certain amount.

Although not explicitly shown in the unified data source for voice of customer (text data) data structure 114, a topic and/or theme can be related to a brand/product line. For example, a topic and/or theme can be for brand/product X laptop computers, brand/product Y laptop computers, brand/product A notebook computers, brand/product B notebook computers, brand/product J desktop computers, brand/product K desktop computers, product P servers and so on. Similarly, a topic and/or theme can be related to a support service level, e.g., premium support, onsite service, mail in service, basic support, basic support with onsite service, under warranty, out of warranty and so on.

Figure 4:
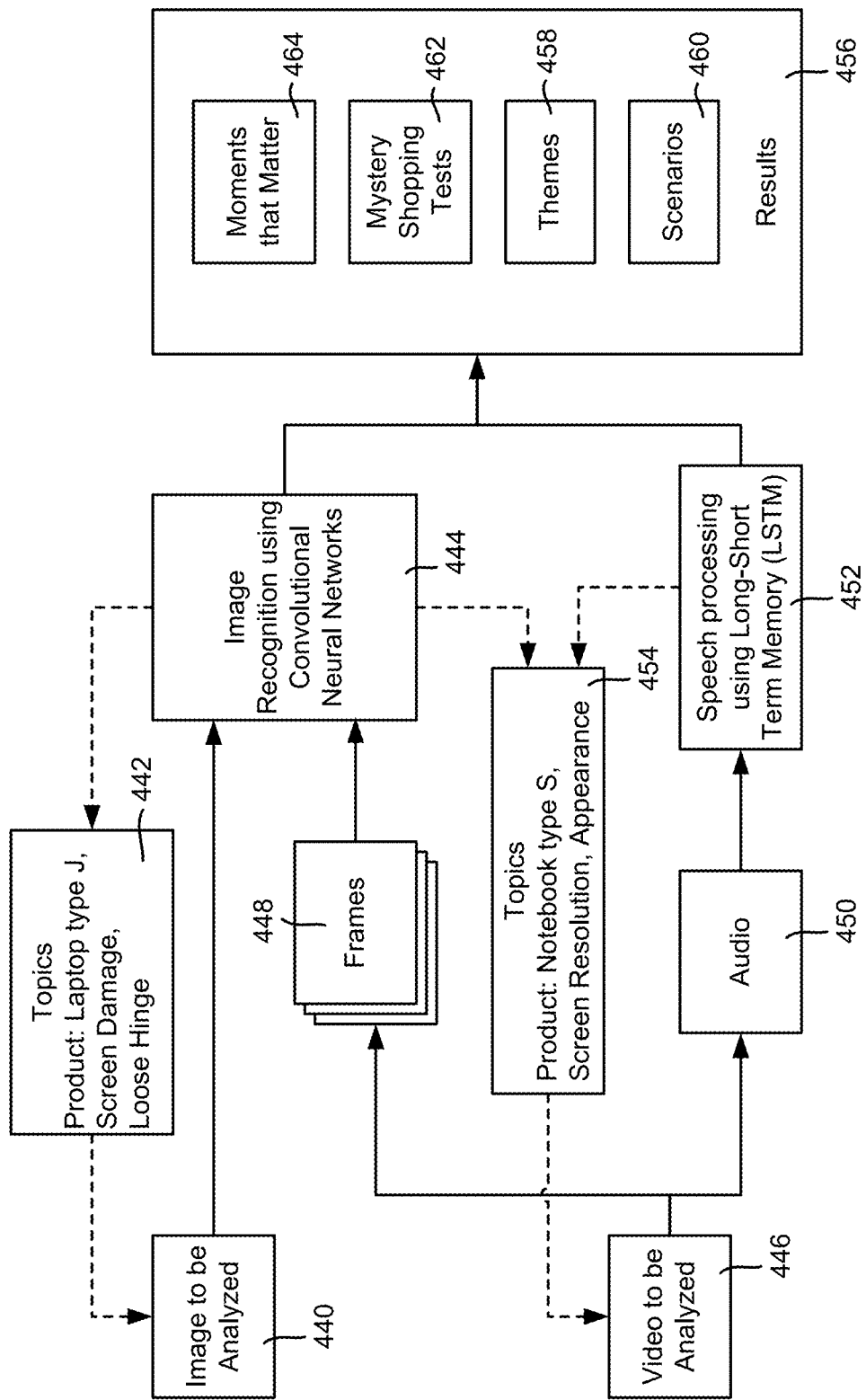
FIG. 4 is an example block diagram representation of processing rich media customer input data via image processing and speech recognition to extract topics from the customer input data, in accordance with various aspects and implementations of the subject disclosure.

Another aspect is image processing and video (including accompanying audio) processing, as generally represented in the example block/dataflow diagram of FIG. 4. For example, each image (e.g., 440) of a group of images can be recognized/classified (block 442) into topics (block 444) and/or other data a product name/type (e.g., laptop type J), product problem (e.g., screen damage, loose hinge) and so on. The image classifier/recognizer can be trained based on labeled images for example, corresponding to various views of a company's products. One suitable image recognition classifier 444 can be based on deep neural networks/convolutional neural networks, such as described in the published reference (corresponding to the link) https://www.oreilly-.com/library/view/strengthening-deep-neural/9781492044949/ch04.html.

Video data 446 to be analyzed (of a group of videos) can be processed in a similar manner, e.g. the frames 448 can be processed and recognized a frame (an image) at a time. Any respective audio 450 (speech) accompanying a respective video can be converted to text in any of several known ways, such as speech processing (block 452) based on Long-Short Term Memory (LSTM) deep neural networks, (see e.g., the above reference/link). Topics 454 can be generated and related back to the video data/audio data.

The topics generated by image recognition and speech recognition can be output into results 456. For example, the topics can be processed into themes 458 as described above. Scenarios 460, such as the first thirty days customer experience, warranty renewal experiences, and service entitlements (a service level to which a customer is entitled, including coverage and experience) can be tied to the themes 458. Tests to simulate customer experiences, such as mystery shopping tests 462 that interact with enterprise employees (unknown to the enterprise employees) as if an actual customer was involved, can be generated as described above. Further, the data can be analyzed into moments that matter (block 464) to customers, such as "pain points" and "happy paths" of customers based on their experiences, to focus and determine the reasons for why some things go wrong and why some things go right.

Figure 5:
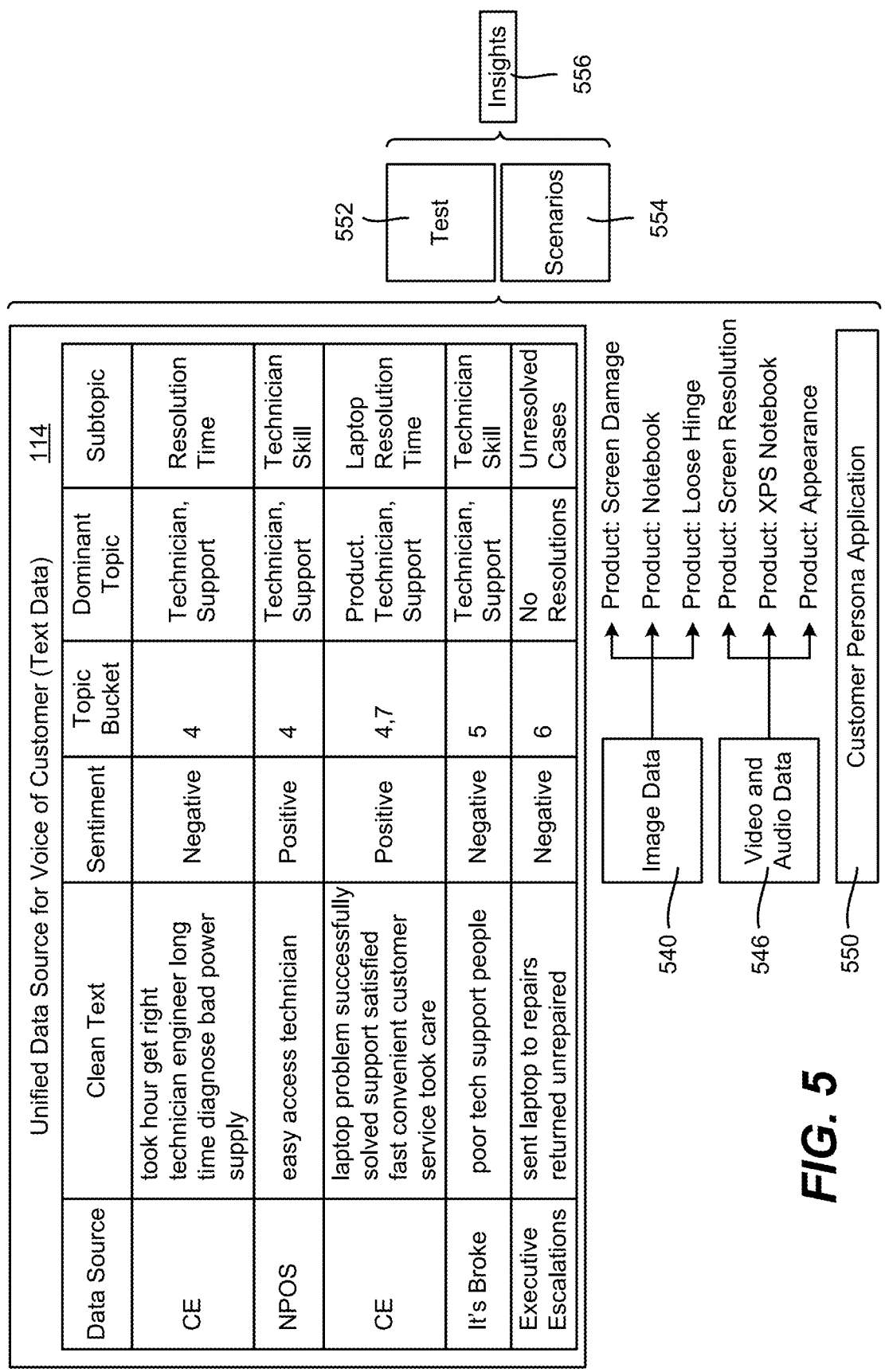
FIG. 5 is an example block diagram representation of combining natural language processing of text data with rich media processing to determine tests and scenarios, as well as obtain insights, in accordance with various aspects and implementations of the subject disclosure.

As shown in FIG. 5, the various information obtained from the text data sources, image data, video data and speech data can be combined into such tests and scenarios. Further, a customer persona application program or the like can be used to synthesize different types of customers to associate with a test or a scenario. For example, one customer set may be considered highly technically skilled (not expected to need much help unless something is significantly wrong), another set considered medium skilled (likely to need some guidance for more difficult issues), while another set is for novice customers (likely to need even basic help). As is understood, these are only some non-limiting examples of possible personas, and any different levels of personas can be extracted from the text data sources, image data, video data and speech data, as well as fictionally created for a given test scenario.

The various information (block 114 and obtained from blocks 540 and 546) can be used to generate tests 552 and scenarios 554 as described herein. The tests 552 (e.g., their results) and scenarios 554 can be further evaluated to obtain insights 556 that are valuable to an enterprise with respect to their customers.

For example, the data along with test results can show how customers feel about the scenario of renewing a warranty, such as too difficult online, inconsistent pricing, confusing issues, different terminology "renewal, extension, and upgrade are used interchangeably," only some of the possible options are provided, there is only a minimal description of what is covered, and so forth. For an entitlement scenario, many things can go well (e.g., easy to find entitlement status, many helpful tips beyond the initial issue), while others were problematic, (e.g., not satisfied with the level of support that was purchased, did not meet expectations) and so forth. A first thirty days (after purchase) scenario can get results that deal with things like easy exchanges/returns when dealing with a person, but difficult and confusing when attempting an online return or exchange, and so forth.

By way of example, FIG. 6 shows tests designed for various products and service levels, and what resulted during the conducting of simulated tests generated for themes extracted from the data based on the various topics, dominant topics and/or subtopics. The example in FIG. 6 shows tests for various products and support levels throughout various resolution attempt stages, and a final result.

Figure 7:
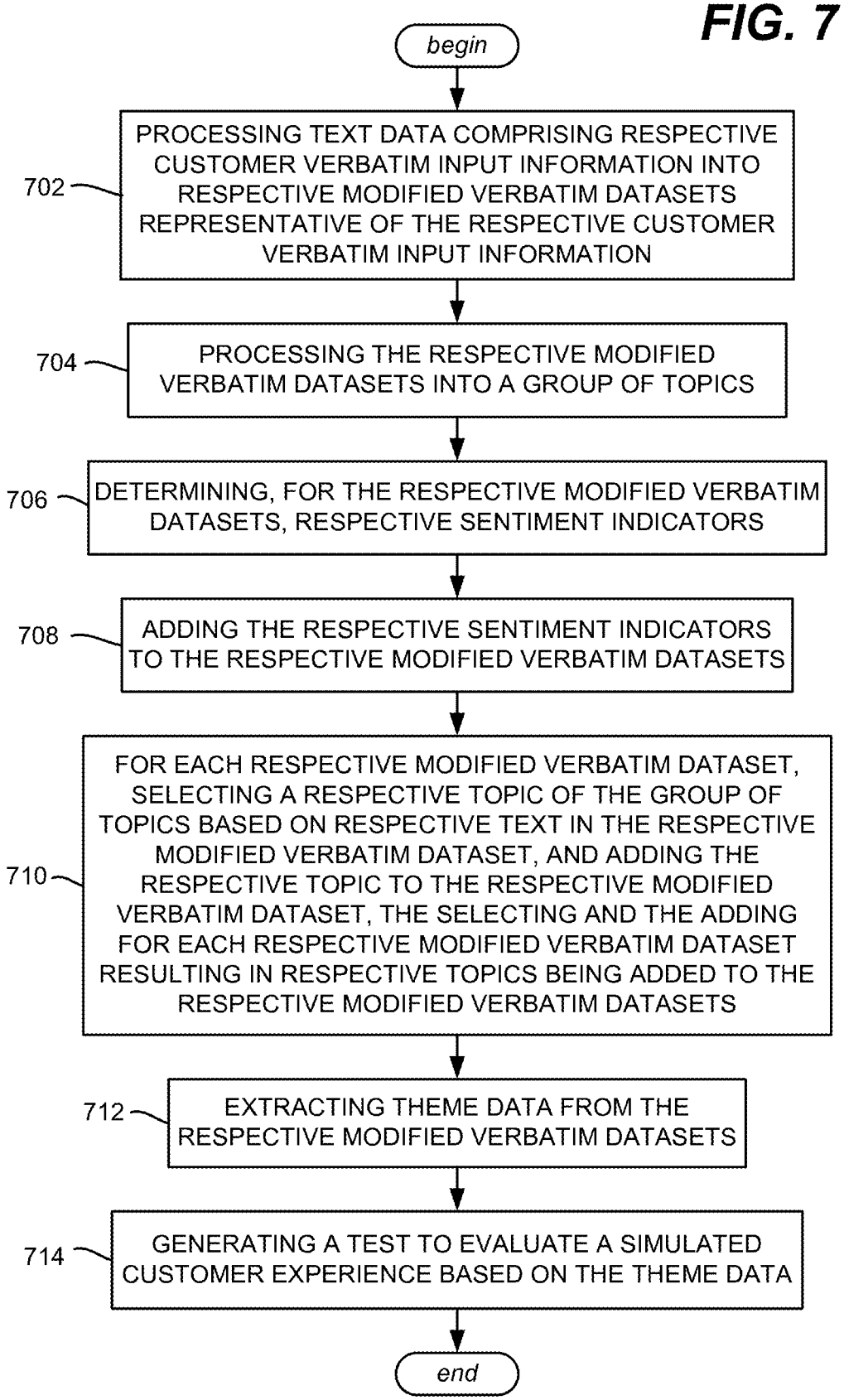
FIG. 7 is a flow diagram showing example operations related to processing customer input data to generate a test of a simulated customer experience, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents processing text data comprising respective customer verbatim input information into respective modified verbatim datasets representative of the respective customer verbatim input information. Operation 704 represents processing the respective modified verbatim datasets into a group of topics. Operation 706 represents determining, for the respective modified verbatim datasets, respective sentiment indicators. Operation 708 represents adding the respective sentiment indicators to the respective modified verbatim datasets. Operation 710 represents, for each respective modified verbatim dataset, selecting a respective topic of the group of topics based on respective text in the respective modified verbatim dataset, and adding the respective topic to the respective modified verbatim dataset, the selecting and the adding for each respective modified verbatim dataset resulting in respective topics being added to the respective modified verbatim datasets. Operation 712 represents extracting theme data from the respective modified verbatim datasets. Operation 714 represents generating a test to evaluate a simulated customer experience based on the theme data.

The text data can comprise verbatim text data, and processing of the text data into the respective modified verbatim datasets can comprise at least one of: correcting spelling errors in the verbatim text data, removing stopwords from the verbatim text data, or removing personal information from the verbatim text data.

Further operations can comprise adding respective subtopics to the respective modified verbatim datasets based on the respective text in the respective modified verbatim datasets.

The theme data extracted from the respective modified verbatim datasets can comprise a first part of the theme data, further operations can comprise applying image processing to image data to obtain image recognition text data; the theme data can comprise a second part of the theme data based on the image recognition text data.

The image data can correspond to a photograph. The image data can correspond to a frame of video data, and the theme data can comprise a third part of the theme data based on recognized text-to-speech data recognized from speech data associated with the image data.

Processing of the respective modified verbatim datasets into the group of topics can comprise topic modeling the modified verbatim datasets via an Lda2vec model.

Determining the respective sentiment indicators can comprise determining, for each modified verbatim dataset of the respective modified verbatim datasets, a positive sentiment indicator or negative sentiment indicator, and associating the modified verbatim dataset with the positive sentiment indicator or negative sentiment indicator. Extracting of the theme data can comprise grouping, based on the respective topics, the respective modified verbatim datasets into modified verbatim dataset topic groups, and obtaining a sentiment score for each topic group of the modified verbatim dataset topic groups, comprising counting associated modified verbatim datasets in the topic group that are associated with negative sentiment indicators. Further operations can comprise evaluating the sentiment score for each topic group relative to a threshold value to select the theme data to use for the generating of the test.

Further operations further can comprise selecting a simulated customer persona; generating of the test based on the theme data can comprise generating the test based on the simulated/synthesized customer persona.

Figure 8:
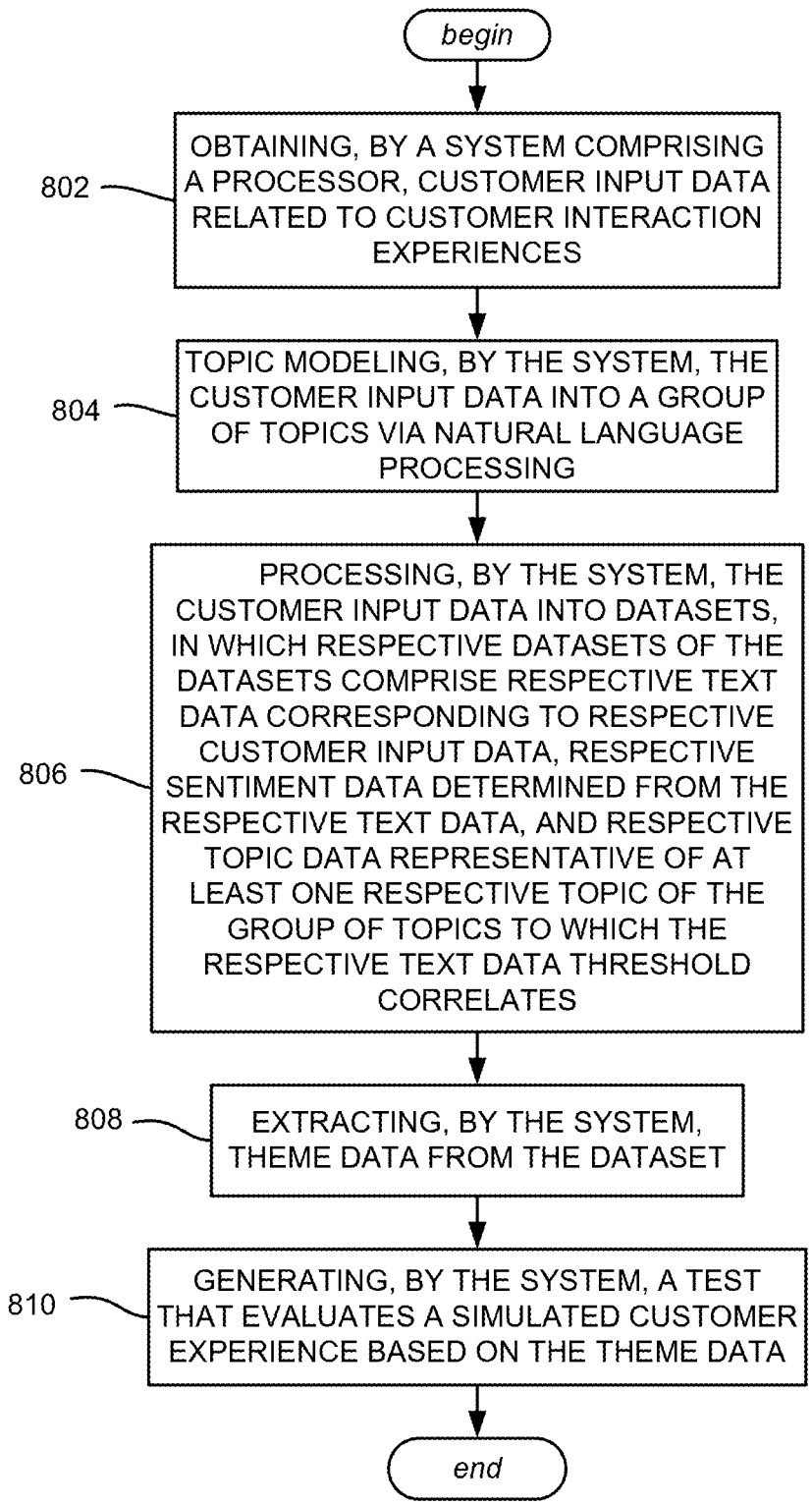
FIG. 8 is a flow diagram showing example operations related to topic modeling customer input data to extract theme data, and generate a test of a simulated customer experience based on the theme data, in accordance with various aspects and implementations of the subject disclosure.

One or more example aspects, such as corresponding to operations of a method, are represented in FIG. 8. Operation 802 represents obtaining, by a system comprising a processor, customer input data related to customer interaction experiences. Operation 804 represents topic modeling, by the system, the customer input data into a group of topics via natural language processing. Operation 806 represents processing, by the system, the customer input data into datasets, in which respective datasets of the datasets comprise respective text data corresponding to respective customer input data, respective sentiment data determined from the respective text data, and respective topic data representative of at least one respective topic of the group of topics to which the respective text data threshold correlates. Operation 808 represents extracting, by the system, theme data from the datasets. Operation 810 represents generating, by the system, a test that evaluates a simulated customer experience based on the theme data.

Obtaining the customer input data related to the customer interaction experiences further can comprise receiving image data, and classifying the image data.

Aspects can comprise, determining, by the system based on the respective topic data and the respective text data of the respective datasets, respective subtopic data representative of at least one respective subtopic of the at least one respective topic, and associating the respective subtopic data with the respective datasets.

Extracting the theme data from the datasets can comprise processing the respective sentiment data, the respective topic data and the respective subtopic data of the respective datasets to determine a representative value representing a group of datasets determined to have a common topic and a common subtopic, and determined to have negative sentiment data.

Aspects can comprise triggering, by the system, the generating of the test based on the representative value being determined to have reached a threshold value.

Obtaining of the customer input data can comprise processing customer verbatim text data into the customer input data, which can comprise at least one of: correcting spelling errors in the verbatim text data, removing stopwords from the verbatim text data, or removing personal information from the verbatim text data.

The topic modeling of the customer input data via the natural language processing can comprise inputting the customer input data into an Lda2vec model.

Figure 9:
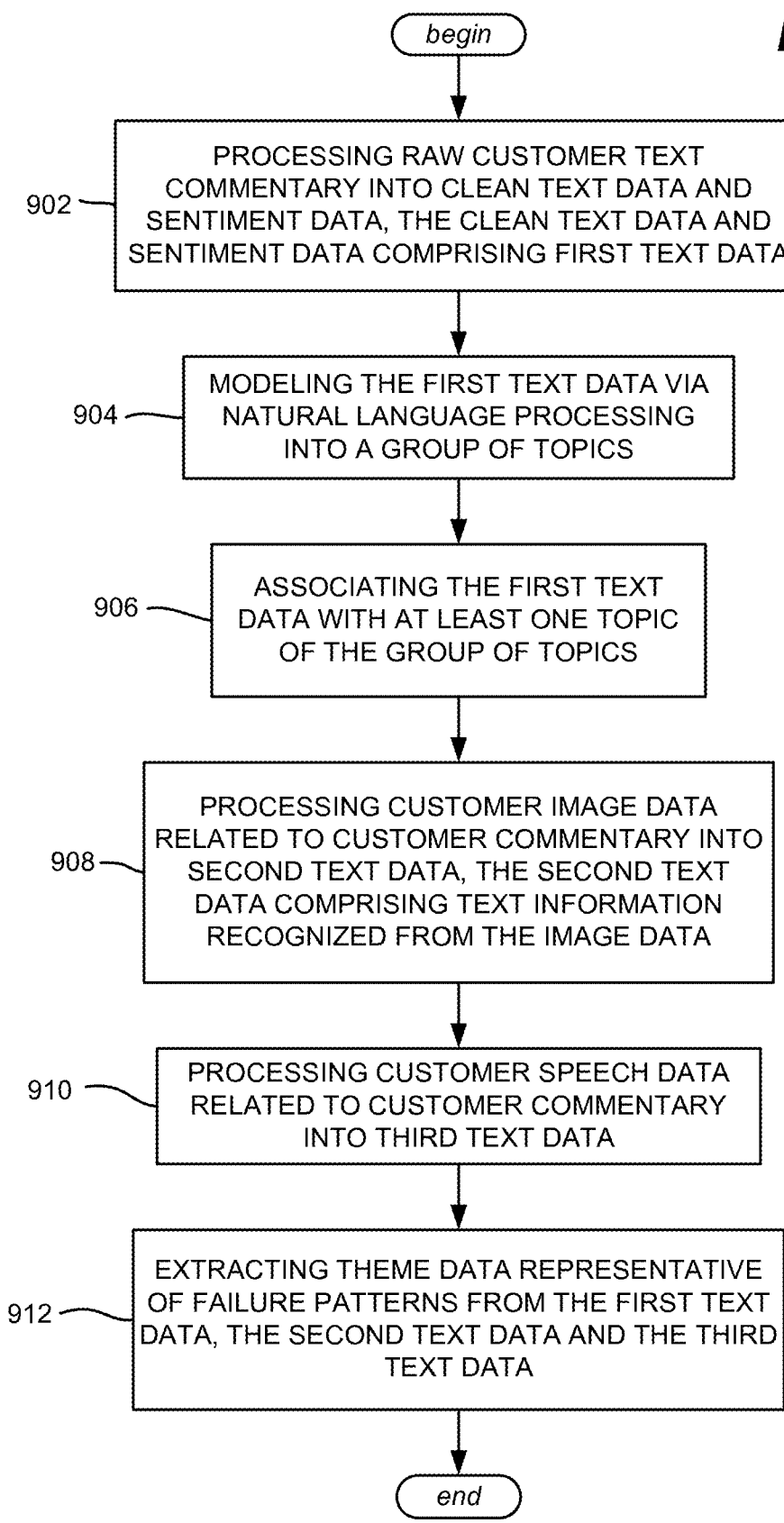
FIG. 9 is a flow diagram showing example operations related to processing customer input data comprising text data and image data to extract theme data representative of failure patterns, in accordance with various aspects and implementations of the subject disclosure.

FIG. 9 summarizes various example operations, e.g., corresponding to a machine-readable storage medium, comprising executable instructions that, when executed by a processor, facilitate performance of operations. Operation 902 represents processing raw customer text commentary into clean text data and sentiment data, the clean text data and sentiment data comprising first text data. Operation 904 represents modeling the first text data via natural language processing into a group of topics. Operation 906 represents associating the first text data with at least one topic of the group of topics. Operation 908 represents processing customer image data related to customer commentary into second text data, the second text data comprising text information recognized from the image data. Operation 910 represents processing customer speech data related to customer commentary into third text data. Operation 912 represents extracting theme data representative of failure patterns from the first text data, the second text data and the third text data.

Further operations can comprise generating, based on the theme data, test instructions, representative of a test, that, when executed, simulate a customer experience.

As can be seen, described is a technology that can extract top recurring themes, including failure themes, in complex customer journeys based on various input data obtained from customers. The technology can set automated triggers, e.g., to generate tests, for frequently occurring failure themes against a set threshold. The technology applies natural language processing, image processing and/or computer vision techniques to create themes, tests and scenarios. The technology provides ways to discover insights and leverage those insights to improve customer experiences, map good experiences as well as bad, and determine moments that matter from a customer's point of view. The technology can be used to recreate a customer engagement, journey and overall experience by designing test scenarios around failure themes.

Figure 10:
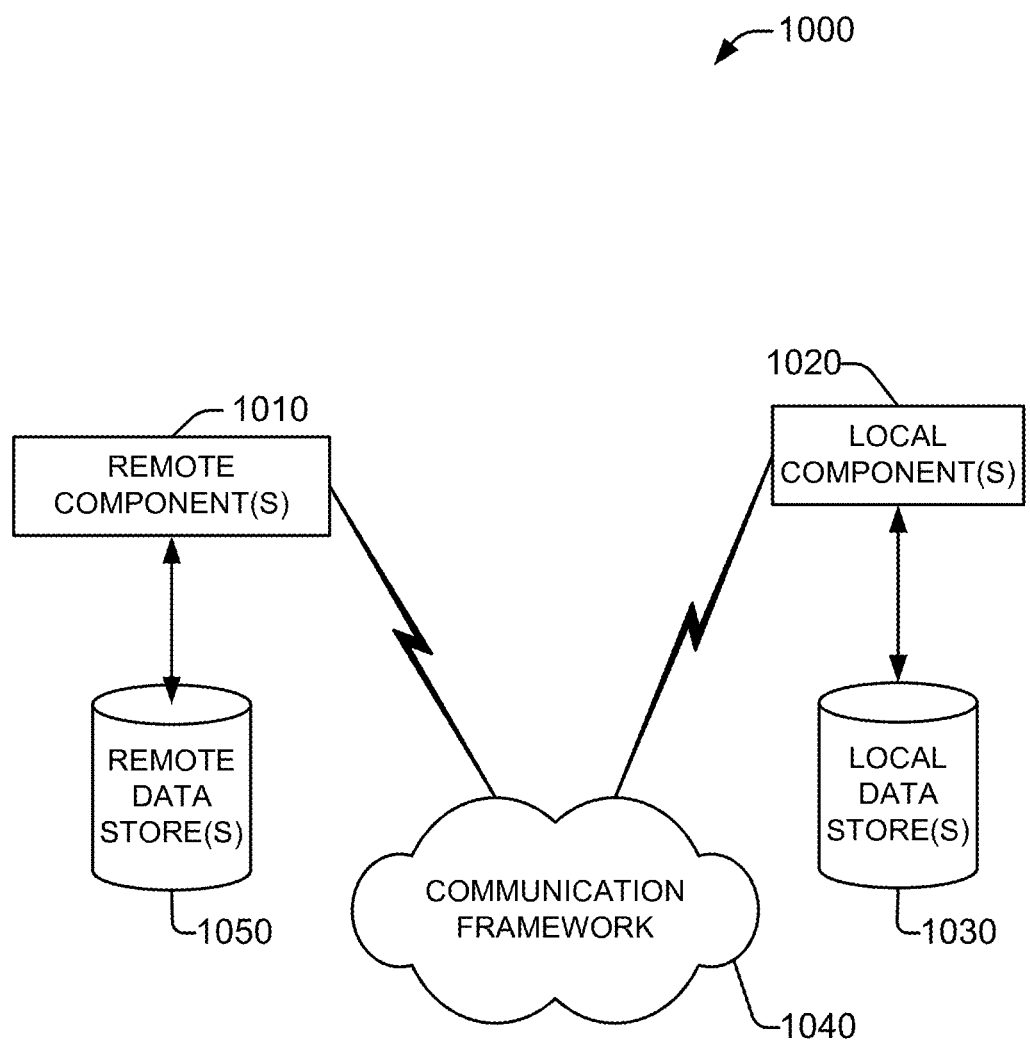
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
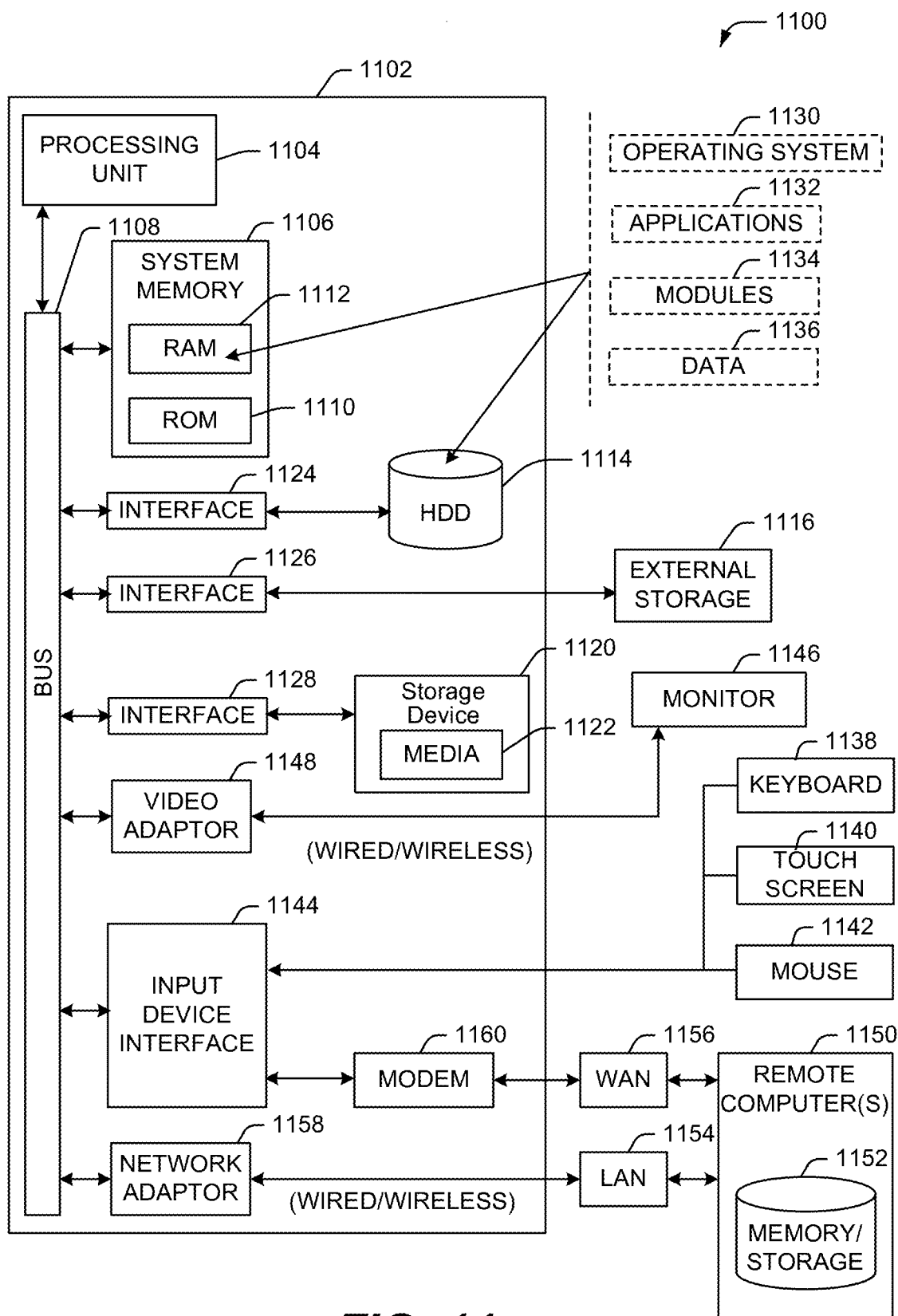
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE-1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a processor, and a memory that stores executable instructions that, when executed by the processor, facilitate performance of operations, the operations comprising:
   processing text data comprising respective customer verbatim input information into respective modified verbatim datasets representative of the respective customer verbatim input information;
   processing the respective modified verbatim datasets into a group of topics;
   determining, for the respective modified verbatim datasets, respective sentiment indicators;
   adding the respective sentiment indicators to the respective modified verbatim datasets;
   for each respective modified verbatim dataset, selecting a respective topic of the group of topics based on respective text in the respective modified verbatim dataset, and adding the respective topic to the respective modified verbatim dataset, the selecting and the adding for each respective modified verbatim dataset resulting in respective topics being added to the respective modified verbatim datasets;
   extracting theme data from the respective modified verbatim datasets;
   selecting a simulated customer persona; and
   generating a test to evaluate a simulated customer experience based on the theme data and the simulated customer persona.

2. The system of claim 1, wherein the text data comprises verbatim text data, and wherein the processing of the text data into the respective modified verbatim datasets comprises at least one of: correcting spelling errors in the verbatim text data, removing stopwords from the verbatim text data, or removing personal information from the verbatim text data.

3. The system of claim 1, wherein the operations further comprise adding respective subtopics to the respective modified verbatim datasets based on the respective text in the respective modified verbatim datasets.

4. The system of claim 1, wherein the theme data extracted from the respective modified verbatim datasets comprises a first part of the theme data, wherein the operations further comprise applying image processing to image data to obtain image recognition text data, and wherein the theme data comprises a second part of the theme data based on the image recognition text data.

5. The system of claim 4, wherein the image data corresponds to a photograph.

6. The system of claim 4, wherein the image data corresponds to a frame of video data, and wherein the theme data comprises a third part of the theme data based on recognized text-to-speech data recognized from speech data associated with the image data.

7. The system of claim 1, wherein the processing of the respective modified verbatim datasets into the group of topics comprises topic modeling the modified verbatim datasets via an Lda2vec model.

8. The system of claim 1, wherein the determining of the respective sentiment indicators comprises determining, for each modified verbatim dataset of the respective modified verbatim datasets, a positive sentiment indicator or negative sentiment indicator, and associating the modified verbatim dataset with the positive sentiment indicator or negative sentiment indicator.

9. The system of claim 8, wherein the extracting of the theme data comprises grouping, based on the respective topics, the respective modified verbatim datasets into modified verbatim dataset topic groups, and obtaining a sentiment score for each topic group of the modified verbatim dataset topic groups, comprising counting associated modified verbatim datasets in the topic group that are associated with negative sentiment indicators.

10. The system of claim 9, wherein the operations further comprise evaluating the sentiment score for each topic group relative to a threshold value to select the theme data to use for the generating of the test.

11. A method, comprising:
    obtaining, by a system comprising a processor, customer input data related to customer interaction experiences;
    topic modeling, by the system, the customer input data into a group of topics via natural language processing;
    processing, by the system, the customer input data into datasets, in which respective datasets of the datasets comprise respective text data corresponding to respective customer input data, respective sentiment data determined from the respective text data, and respective topic data representative of at least one respective topic of the group of topics to which the respective text data threshold correlates; extracting, by the system, theme data from the datasets;
    selecting, by the system, a simulated customer persona; and
    generating, by the system, a test that evaluates a simulated customer experience based on the theme data and the simulated customer persona.

12. The method of claim 11, wherein the obtaining of the customer input data related to the customer interaction experiences further comprises receiving image data, and classifying the image data.

13. The method of claim 11, further comprising, determining, by the system based on the respective topic data and the respective text data of the respective datasets, respective subtopic data representative of at least one respective subtopic of the at least one respective topic, and associating the respective subtopic data with the respective datasets.

14. The method of claim 11, where the extracting of the theme data from the datasets comprises processing the respective sentiment data, the respective topic data and respective subtopic data of the respective datasets to determine a representative value representing a group of datasets determined to have a common topic and a common subtopic, and determined to have negative sentiment data.

15. The method of claim 14, further comprising triggering, by the system, the generating of the test based on the representative value being determined to have reached a threshold value.

16. The method of claim 11, wherein the obtaining of the customer input data comprises processing customer verbatim text data into the customer input data, comprising correcting spelling errors in the verbatim text data, removing stopwords from the verbatim text data, or removing personal information from the verbatim text data.

17. The method of claim 11, wherein the topic modeling of the customer input data via the natural language processing comprises inputting the customer input data into an Lda2vec model.

18. A non-transitory machine-readable storage medium, comprising executable instructions that, when executed by a processor, facilitate performance of operations, the operations comprising:
  processing raw customer text commentary into clean text data and sentiment data, the clean text data and sentiment data comprising first text data;
  modeling the first text data via natural language processing into a group of topics; associating the first text data with at least one topic of the group of topics;
  processing customer image data related to customer commentary into second text data, the second text data comprising text information recognized from the customer image data;
  processing customer speech data related to customer commentary into third text data;
  extracting theme data representative of failure patterns from the first text data, the second text data and the third text data;
  selecting a simulated customer persona; and
  generating, based on the theme data and the simulated customer persona, test instructions, representative of a test, that, when executed, simulate a customer experience.

19. The non-transitory machine-readable storage medium of claim 18, wherein the operations further comprise determining that the test instructions are to be executed based on an amount of occurrences of themes with a negative sentiment being above a threshold percentage.

20. The non-transitory machine-readable storage medium of claim 18, wherein the extracting of the theme data comprises obtaining respective sentiment scores for respective topics of the group of topics, and evaluating the respective sentiment scores relative to a threshold value to select the theme data to use for the generating of the test instructions.

* * * * *